United States Patent
Takahashi et al.

(10) Patent No.: US 6,339,439 B1
(45) Date of Patent: *Jan. 15, 2002

(54) DEVICE FOR MODIFYING APPEARANCE OF RELATED DISPLAY PLANES

(75) Inventors: Yoshio Takahashi; Takamasa Uramoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,609

(22) Filed: Sep. 24, 1997

(30) Foreign Application Priority Data

Sep. 24, 1996 (JP) .............................. 8-251518
Jul. 1, 1997 (JP) .............................. 9-175478

(51) Int. Cl.$^7$ .............................. G06F 3/00; G06F 3/14
(52) U.S. Cl. ........................ 345/853; 345/765; 345/804
(58) Field of Search ................................. 345/333–334, 345/340, 346, 356, 744, 762, 765, 769, 781, 853, 803–806, 861, 866; 707/511, 530, 539

(56) References Cited

U.S. PATENT DOCUMENTS

| | | | | |
|---|---|---|---|---|
| 5,065,347 A | * | 11/1991 | Pajak et al. ................. | 345/348 |
| 5,179,657 A | * | 1/1993 | Dykstal et al. .............. | 345/335 |
| 5,226,117 A | * | 7/1993 | Miklos ........................ | 345/356 |
| 5,241,624 A | * | 8/1993 | Torres ......................... | 345/429 |
| 5,388,196 A | * | 2/1995 | Pajak et al. ............. | 345/340 X |
| 5,764,226 A | * | 6/1998 | Consolatti et al. .......... | 345/333 |
| 6,014,138 A | * | 1/2000 | Cain et al. .............. | 345/356 X |

OTHER PUBLICATIONS

James Foley, "Computer Graphics", Addison–Wesley Publishing Company, pp. 444–449, Nov. 1993.*

* cited by examiner

Primary Examiner—Raymond J. Bayerl
Assistant Examiner—X. L. Bautista
(74) Attorney, Agent, or Firm—Staas & Halsey

(57) ABSTRACT

An information display device capable of displaying logical display planes includes a first part for storing items of display plane forming information respectively defined for the logical display planes, and a second part for displaying the logical display planes on a screen part in accordance with the items of the display plane forming information, wherein the items of the display plane forming information of logical display planes that have a hierarchical relationship include information describing the hierarchical relationship and commonly own attribute information concerning a component commonly used in the logical display planes having the hierarchical relationship.

20 Claims, 9 Drawing Sheets

DEVICE FOR MODIFYING APPEARANCE OF RELATED DISPLAY PLANES

BACKGROUND OF THE INVENTION

1. Field of the Invention

The present invention relates to a GUI (Graphical User Interface) with a display plane displayed on a display part, and more particularly to a user interface at the time of generating a derivative display plane.

2. Description of the Prior Art

A technique is generalized in which a plurality of logical display planes (hereinafter referred to as sheets) are superimposed or arranged side by side on a display part and a cursor is positioned on a component depicted in the sheets by a pointing device such as a mouse or a track ball, at which position a button of the mouse or the like is clicked so that information processing proceeds. The technique is called GUI (Graphical User Interface), and is used in the XWindow system in the UNIX and the Windows of Microsoft.

In the GUI system described above, all event outputs and operations are carried out through a display sheet. Hence, when the process proceeds while transitions of the procedure for information processing takes place, it is necessary to create derivative sheets for operation corresponding to the contents of changed works and display the derivative sheets. There are many cases where the derivative sheet after a transition has a display pattern common to that included in the derivative sheet before the transition takes place. Hence, the derivative sheet after a transition is generally created by copying the derivative sheet before the transition takes place, and arranging the copied derivative sheet so that a component in the copied derivative sheet is modified or a new component is added thereto and that the execution procedures defined in the components are modified.

FIG. 1 is a diagram of a computer system. A basic sheet 101 and a derivative sheet 201 obtained by copying the basic sheet 101 are displayed on a display part 60 connected to a computer main body 100 so that the basic sheet 101 and the derivative sheet 201 are arranged side by side. The basic sheet 101 and the derivative sheet 201 have common components (a telephone mark 111, a character train "telephone" 121, a telephone mark 211 and a character train "telephone" 221). By manipulating a mouse 10, a cursor 10K on the display part 60 is moved to, for example, the telephone mark 211 in the derivative sheet 201. Then, the click operation on the mouse 10 is carried out. Hence, a predetermined procedure (event) is initiated, and a remote party is called or rings a bell.

FIG. 2 is a diagram of conventional display operations and display states, and shows a sequence in which the derivative sheet 203 is created from the basic sheet 101 on the display part 60.

Referring to FIG. 2, the basic sheets (101, 102) and the derivative sheets (201–203) are defined by sheet configuration data stored in corresponding display plane memories (1001–2003), and are displayed or executed by a structure shown in FIG. 3, which will be described later. The corresponding display plane memories denote memory areas allocated in a memory built in the computer main body 100 or a memory externally connected thereto.

On the display part 60, two components are set in the basic sheet shown in the upper left portion in FIG. 2 in which display positions and a display frame are defined. The first component is the telephone mark, which is displayed in the determined position in which the telephone mark 111 is set. When the not shown cursor of the mouse 10 is positioned on the telephone mark 111 and the click operation is carried out, the already defined procedure (event) is executed. For example, the bell is ringed. When the procedure of dialing a destination is predetermined, the destination is called. The second component is a character train, which is displayed, with given size fonts, in the position to which "telephone" 121 is set.

The derivative sheet 201 shown in the upper right portion in FIG. 2 is created by copying the contents of the basic sheet 101 stored in the display plane memory 1001 to the display plane memory 2001. Then, the contents of the display plane memories 1001 and 2001 are modified or components are added thereto. That is, the basic sheet 101 shown in the upper left portion in FIG. 2 is modified so that the telephone mark 111 is changed to a mail mark 112 and the procedure is changed from ringing or dialing to voice (for example, "a mail has arrived"). Further, the character train "telephone" 121 is changed to a character train "mail" 122. Thus, the basic sheet 102 shown in the lower left portion in FIG. 2 is created.

A note symbol 311 is added to the derivative sheet 201 shown in the upper right portion in FIG. 2. Further, the derivative sheet 202 shown in the lower left portion in FIG. 2 is created, which define a procedure of, for example, outputting a melody. In this case, it is necessary to reflect, on the derivative sheet 202 shown in the right center portion, the modified portion of the basic sheet 102 shown in the lower left portion. That is, the derivative sheet 203 shown in the lower right portion in FIG. 2 is created as follows. The telephone mark 212 and its procedure "bell ringing or dialing" in the derivative sheet are changed to the postal code and a voice message "mail has arrived". Further, the character train "telephone" 222 is changed to a character train "mail". As described above, the work of creating the derivative sheet 203 shown in the lower right portion of FIG. 2 is additionally required.

FIG. 3 is a diagram showing a structure of a sheet processing means for executing the above-mentioned display plane work. The sheet processing means is implemented by the computer main body 100. A signal indicating the coordinates of the cursor 10K on the display part 60 is input to a coordinates detecting part 11 by clicking a not-shown button of the mouse 10. A click signal depending on the clicking way (single click, double click, drag and drop) is input to a signal discriminating part 12.

A sheet creation executing part 13 supplied with the output signals of the coordinates detecting part 11 and the signal discriminating part 12 accesses a memory 41 through a read/write control part 14. Then, the sheet creation executing part 13 retrieves a sheet registration area 42 formed in the memory 41, and searches for a sheet on which the cursor 10k is displayed at present. If a plurality of sheets are displayed in an overlap formation, the sheet having priority over the other sheets (which is, for example, the sheet displayed in the forefront of the overlap formation) is selected as the first sheet.

The sheet processing means can selectively execute a take-over mode, a modify mode and an execution mode indicated by a mode signal input to the sheet creation executing part 13 by an operation on the mouse 10 or an operation on a data input means such as a keyboard.

[When the Take-over Mode is Set by the Mode Signal]

A new sheet creation is selected from a menu that is not shown, and a display plane memory for storing information concerning parts which should be set in the newly created sheet (derivative sheet 201) is obtained in the memory 41. When such a display plane memory is obtained in the sheet registration area 42, the derivative sheet 201 is drawn in a predetermined position on the display part 60 so as to have a given frame width. The mouse 10 is manipulated so as to move the cursor 10K to a predetermined position of, for example, a tool bar of the basic sheet 101. In this position, the button of the mouse 10 is dragged. Thereafter, the cursor 10K is moved to the derivative sheet 201 to which the dragged contents should be copied, and is then dropped.

The sheet creation executing part 13 accesses the memory 41 via the read/write control part 14 in response to the drag and drop signals from the mouse 10, and reads the components of the basic sheet 101 (for example, the first sheet) and the information thereon from a component registration area 43. Then, the derivative sheet 201 (for example, the second sheet in the sheet registration area and the secondsheet-related component registration part in the component registration area 43) takes over all the components and information.

[When the Modify Mode is Set by the Mode Signal]

The sheet creation executing part 13 compares the display positions of the components set in the area in the sheet registration area 42 corresponding to the basic sheet 101 (for example, the first sheet) with the positions indicated by the cursor 10K. If there is a component which coincides with the position indicated by the cursor 10K, the sheet creation executing part 13 performs a modifying work for components. More particularly, the sheet creation executing part 13 accesses the component registration area 43 via the read/write control part 14, and reads the information concerning the components of the first sheet. Then, the display plane memory 1001 is modified in accordance with instructions from the data input means such as the keyboard which is not shown. If there is no component which coincides with the position indicated by the cursor 10K, an addition work is performed so that a component is newly registered in accordance with instructions from the data input means such as the keyboard. A sheet drawing execution part 50 displays, on the display part 60 in real time, the modified basic sheet 101 on the basis of the information from the memory 41 read by the read/write control part 14.

[When the Execution Mode is Set by the Mode Signal]

The sheet creation executing part 3 searches for the component corresponding to the position in which the cursor 10K is located and the button of the mouse is clicked. If a procedure is defined for the present component, the sheet creation executing part 13 instructs the sheet drawing execution part 50 to read and execute the above procedure.

The above-mentioned prior art requires the initial work at the time of creating transition display planes in which all information of the original sheet is copied unconditionally. Hence, if a modification such as a correction or addition is given to one of the copying sheet and the copied sheet, such a modification cannot directly be reflected on the other sheet. The above is particularly conspicuous in a case where a large number of components are included in the sheets in a complex formation or a case where a derivative sheet is created by repeatedly performing the copy work several times in a hierarchical formation.

SUMMARY OF THE INVENTION

An object of the present invention is to provide an information display device in which the above problems are eliminated.

A more specific object of the present invention is to provide an information display device in which, when derivative sheets having a hierarchical arrangement are created, correction work for such derivative sheets is reduced as much as possible, and a modification given to copy-source sheets can easily be reflected on derivative sheets, and in which a procedure (event) can definitely be executed.

Another object of the present invention is to provide a computer readable recording medium in which a program for realizing the above information display device is stored.

The above objects of the present invention are achieved by an information display device capable of displaying logical display planes, the device comprising: first means for storing items of display plane forming information respectively defined for the logical display planes; and second means for displaying the logical display planes on a screen part in accordance with the items of the display plane forming information, wherein the items of the display plane forming information of logical display planes that have a hierarchical relationship include information describing the hierarchical relationship and commonly own attribute information concerning a component commonly used in the logical display planes having the hierarchical relationship.

The above structure may be configured so that, when the second means displays a first logical display plane, the second means refers to the display plane forming information concerning the first logical display plane, and the display plane forming information concerning a second logical display plane which is located in a hierarchical level higher than that in which the first logical display plane is located.

The above structure may be configured so as to further comprise third means for, when it is instructed to create a second logical display plane from a first logical display plane, creating the display plane forming information concerning the second logical display plane including information indicating the first logical display plane and for storing the created display plane forming information in the first means.

The above structure may be configured so that: the display plane forming information of the logical display plane located in an upper layer of the hierarchical relationship includes the attribute information concerning the components which are common to the logical display plane located at a lower layer; and the display plane forming information concerning the display plane located at the lower layer includes the attribute information inherent in the logical display plane located at the lower layer.

The above structure may be configured so that the attribute information includes at least one of information concerning a display of the components and the attribute information concerning procedures which should be carried out with regard to the components.

The above objects are also achieved by an information display device comprising: memory means for storing display plane forming information items of information plane forming information respectively corresponding to a plurality of logical display planes; display plane generating means for registering display plane forming information concerning a new display plane and modifying the display plane forming information concerning the existing logical display plane; derivative display plane generating means for setting a take-over relationship between the items of the display plane forming information concerning the logical display planes stored in the memory means; and logical display plane displaying means for displaying the logical display plane to be displayed on the basis of the display plane forming information concerning the logical display plane to be displayed and the display plane forming information of the logical display plane which is a take-over source with respect to the logical display plane to be displayed.

The information display device may be configured so as to further comprise input means for inputting necessary instructions to the display plane generating means and the derivative display plane generating means, and display means for displaying the logical display plane.

Further, the above objects are achieved by a computer readable recording medium storing a computer program comprising: a memory function part for causing a computer to store, in a memory, items of display plane forming information respectively corresponding to a plurality of logical display planes; a display plane generating function part for causing the computer to register, in the memory, display plane forming information concerning a new display plane and modify the display plane forming information concerning the existing logical display plane; a derivative display plane generating function part for causing the computer to set a take-over relationship between the items of the display plane forming information concerning the logical display planes stored in the memory; and a logical display plane displaying function part for causing the computer to display the logical display plane to be displayed on the basis of the display plane forming information concerning the logical display plane to be displayed and the display plane forming information of the logical display plane which is a take-over source with respect to the logical display plane to be displayed.

BRIEF DESCRIPTION OF THE DRAWINGS

The above objects, structures and advantages will become apparent from the following description when read in conjunction with the accompanying drawings.

DESCRIPTION OF PREFERRED EMBODIMENTS

Figure 4:
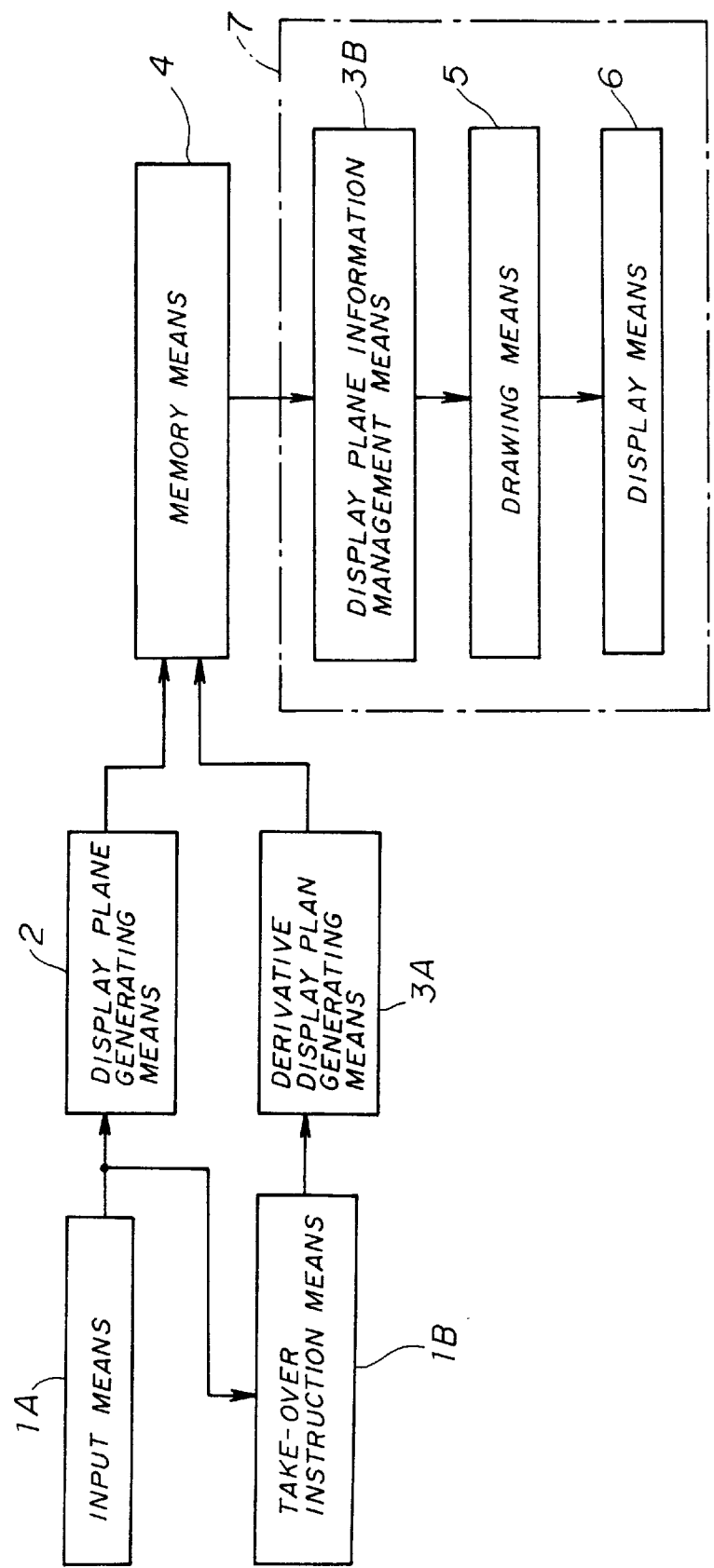
FIG. 4 is a block diagram of an outline structure of an information display device according to an embodiment of the present invention.

FIG. 4 is a diagram of a basic structure of an information display device according to an embodiment of the present invention. The information display device shown in FIG. 4 includes memory means 4 for storing items of display plane forming information respectively corresponding to a plurality of logical display planes (sheets), display plane generating means 2 for registering display plane forming information concerning a new logical display plane or modifying the display plane forming information concerning the existing logical display planes in accordance with instructions from input means 1A including a pointing device such as a mouse and a keyboard, derivative display plane generating means 3A for setting, when an indication from the input means 1A indicates take-over, a take-over relationship (in other words, a hierarchical relationship) between the display plane forming information concerning a logical display plane stored in the memory means and the display plane forming information concerning another logical display plane in accordance with a take-over instruction signal from take-over instruction means 1B, and logical display plane displaying means 7 for displaying a logical display plane to be displayed on the basis of the display plane forming information on the above logical display plane and display plane forming information on the take-over source logical display plane.

The logical display plane displaying means 7 includes drawing means 5 for drawing a display plane on display means 6 such as a CRT display or liquid-crystal display on the basis of the display plane forming information read from the memory means 4, and display plane information management means 3B for obtaining attribute information concerning components from the memory means 4 which stores the display plane forming information of the take-over source.

Figure 5:
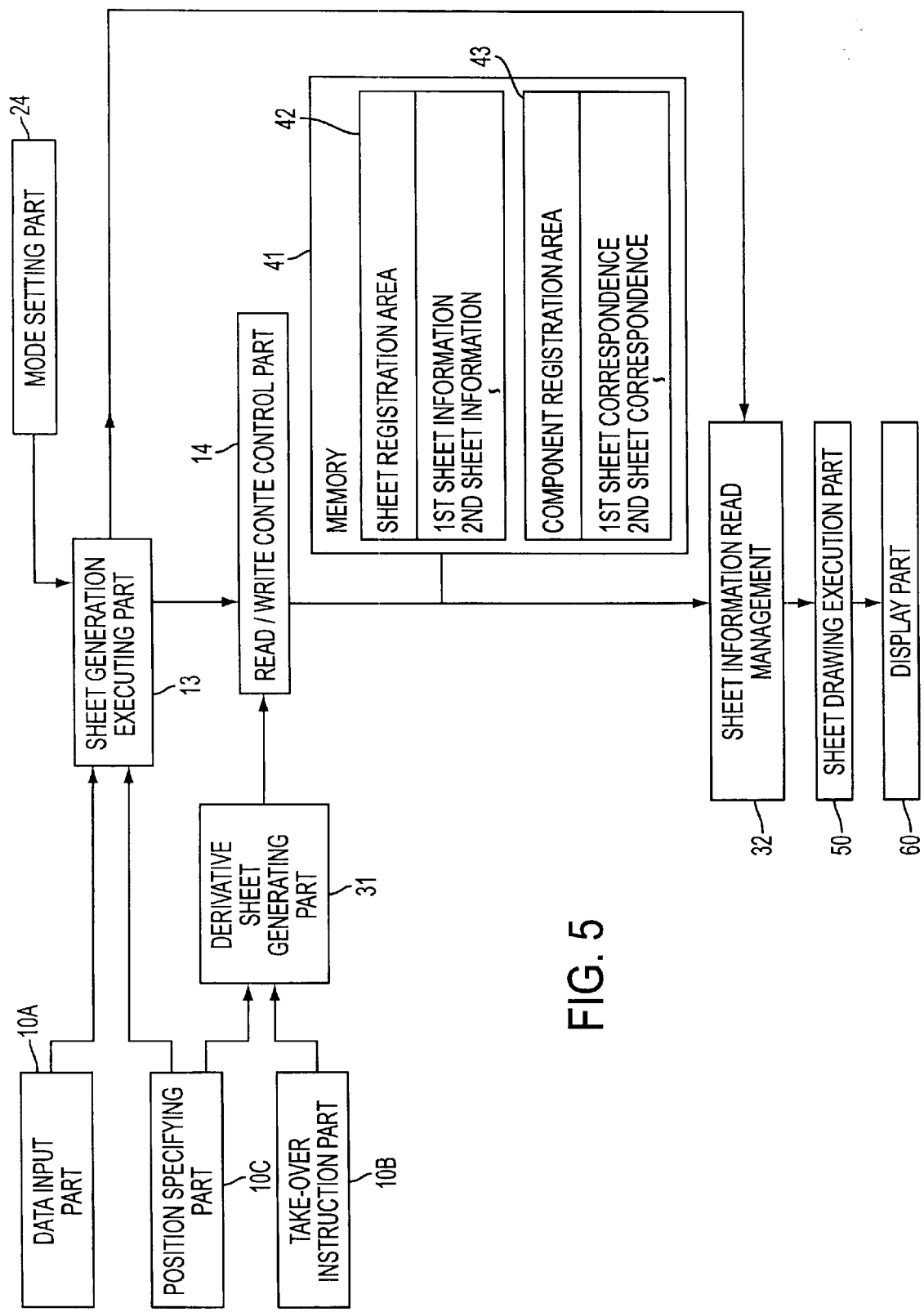
FIG. 5 is a block diagram showing the details of the structure shown in FIG. 4.

FIG. 5 is a block diagram of the detail of the basic structure of the information display device shown in FIG. 4. A data input part 10A is a device such as a keyboard and is used to input data to the information display device. A position specifying part 10C includes a pointing device such as a mouse or a track ball, and specifies the position of a component to be modified or to be newly set. A takeover instruction part 10B indicates a take-over source sheet and a take-over destination sheet by an operation based on a not-shown editing menu displayed on the display part 60 through the data input part 10A or the position specifying part 10C. A sheet generation executing part 13, which is supplied with the signals from the data input part 10A and the position specifying part 10C, sets a component in the specified sheet, modifies a component and its attribute of the specified sheet, and executes a procedure set in the component of the specified sheet. A mode setting part 24 sets an editing or execution mode through the data input part 10A or the position specifying part 10C. A derivative sheet generating part 31 is supplied with the output signals from the position specifying part 10C and the take-over instruction part 10B, and generates a derivative sheet from the specified sheet. The memory 1 includes the sheet registration area 42 and the component registration area 43. The read/write control part 14 accesses the memory 41 to read and write the display plane information therefrom and therein. A sheet information read management part 32 reads sheet information so that the attribute of a component having an attribute which is not registered by tracing a connection to upper sheets (that is, a take-over or hierarchical relationship). Further, the sheet information read management part 32 instructs execution of a procedure of the component read from the memory 41 when the procedure is input from the sheet generation executing part 13. A reference number 50 indicates a sheet drawing execution part, and a reference number 60 indicates a display part 60.

A description will now be given of the correspondence between the structure shown in FIG. 4 and the structure shown in FIG. 5. The input means 1A shown in FIG. 4 corresponds to the data input part 10A and the position specifying part 10C shown in FIG. 5. The take-over instruction means 1B shown in FIG. 4 corresponds to the take-over instruction part 10B. The display plane generating means 2 shown in FIG. 4 corresponds to the sheet generation executing part 13 shown in FIG. 5. The derivative display plane generating means 3A shown in FIG. 4 corresponds to the derivative sheet generating part 31 shown in FIG. 5. The memory means 4 shown in FIG. 4 corresponds to the memory 41 shown in FIG. 5. The display plane information management means 3B shown in FIG. 4 corresponds to the sheet information read management part 32. The drawing means 5 shown in FIG. 4 corresponds to the sheet drawing execution part 50 shown in FIG. 5. The display means 6 shown in FIG. 4 corresponds to the display part 60 shown in FIG. 5. Although there is no block shown in FIG. 4 which directly corresponds to the read/write control part 14 shown in FIG. 5, the part 14 is required that the display play generating means 2, the derivative display plane generating means 3A and the display plane information management means 3B access the memory means 4. There is also no block shown in FIG. 4 which directly corresponds to the mode setting part 24 shown in FIG. 5, it is possible to consider that the input means 1A shown in FIG. 4 corresponds to the mode setting part 24.

Figure 6:
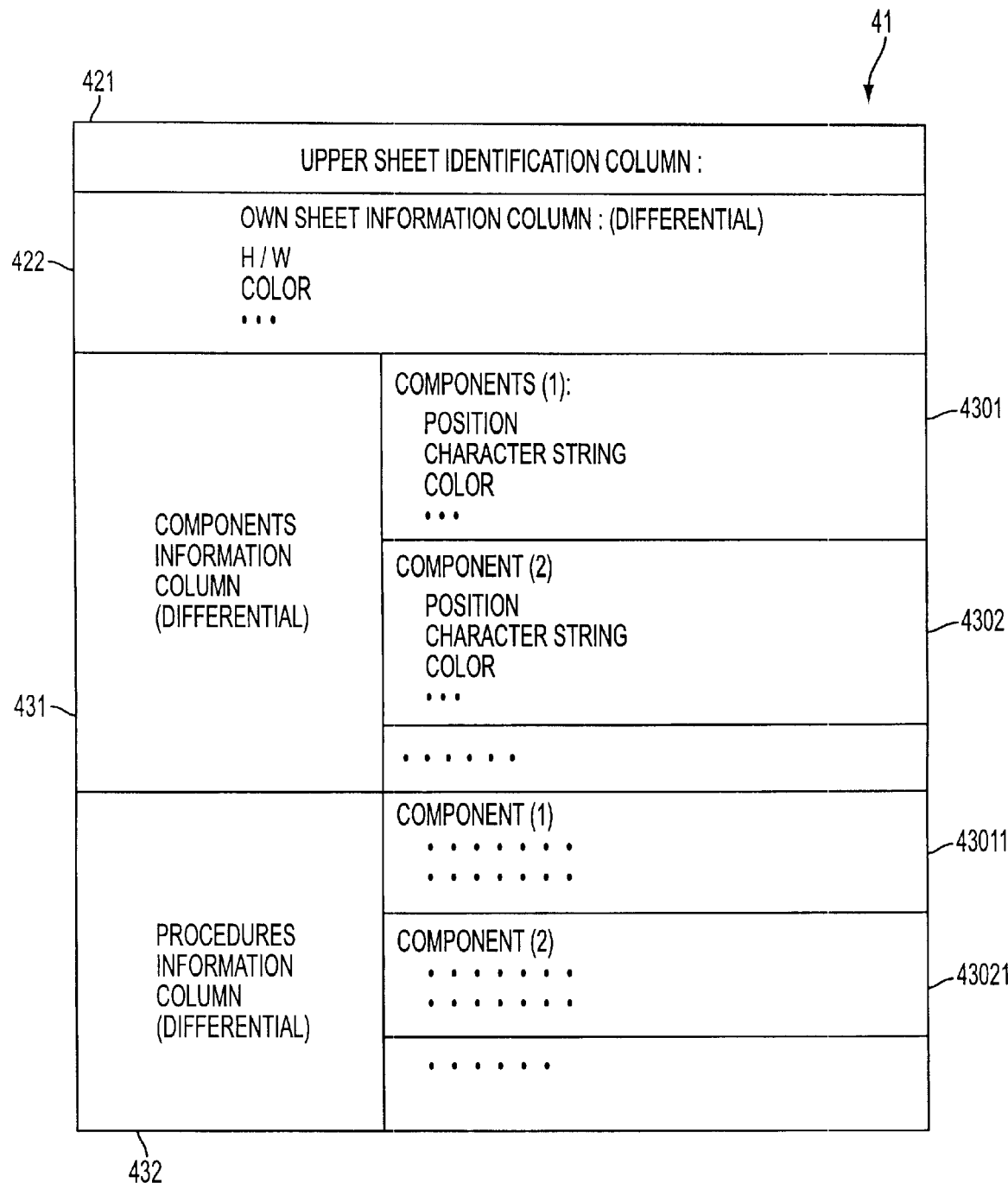
FIG. 6 is a diagram showing a structure of sheet configuration information (display plane memory) forming a sheet.

FIG. 6 is a diagram showing a detailed structure of the sheet forming information stored in the memory 41. As shown, the items of sheet forming information (display plane memory) respectively provided to the individual sheets include an upper sheet identification column 421, a own sheet information column 422, a component information column 431 and a procedure information column. The upper sheet column 421 stores discrimination information concerning a sheet directly located in the upper level with respect to the own sheet. As will be apparent from the following description, the hierarchical relationship between the sheets (take-over relationship) can be described by describing an identification number indicating the sheet of the take-over source in the upper sheet identification column 421. The upper sheet column 421 of the sheet forming information concerning the sheet located in the uppermost level of the hierarchical structure is kept blank or predetermined appropriate data (in the following description, symbol "?") is described therein.

The own sheet information column 422 stores basic information concerning display of the own sheet, and stores information concerning, for example, the size (height H and width W) of the display frame and displayed color. The component information column 431 stores information concerning display of each component of the own sheet (items of component information 4301, 4302), and stores information concerning, for example, the display position, character string and color of each component. The procedure information column 432 stores a procedure which can be set to each component of the own sheet (items of procedure information 43011, 43021), and stores information concerning, for example, the specification of a voice message.

Information described in the component information column 431 and the procedure information column 432 is the attribute information concerning each component.

The own sheet information column 422, the component information column 431 and the procedure information column 432 store difference information indicating the difference between the own sheet and the upper sheet. That is, the columns 422, 431 and 432 store only information different from the information concerning the upper sheet. For example, if component (1) shown in FIG. 6 of the sheet of interest is also present in its upper sheet and the component information 4301 thereon has the same contents as those of the component information 4301 on the upper sheet, the component information indicative of the position, character string and color is kept blank or the aforementioned symbol "?" is described therein. When the present sheet is displayed by using the component information 4301 concerning the component (1) of the upper sheet specified in the upper sheet identification column 421. If only the position of the component (1) is different from that in the upper sheet, only information concerning the position is described. If the hierarchical structure has three or more layers, the information concerning the component (1) may be described in a sheet located two or more layer levels than the layer level of the sheet of interest. Even in this case, the sheet of interest is displayed by using the component information 4301 of the component (1) which is found by tracing the hierarchical relationship.

A description will now be given of an operation of the above information display device. The following description of the operation will be given by separately describing operation modes and work units of the above information display device.

[Editing Mode]

Figure 7:
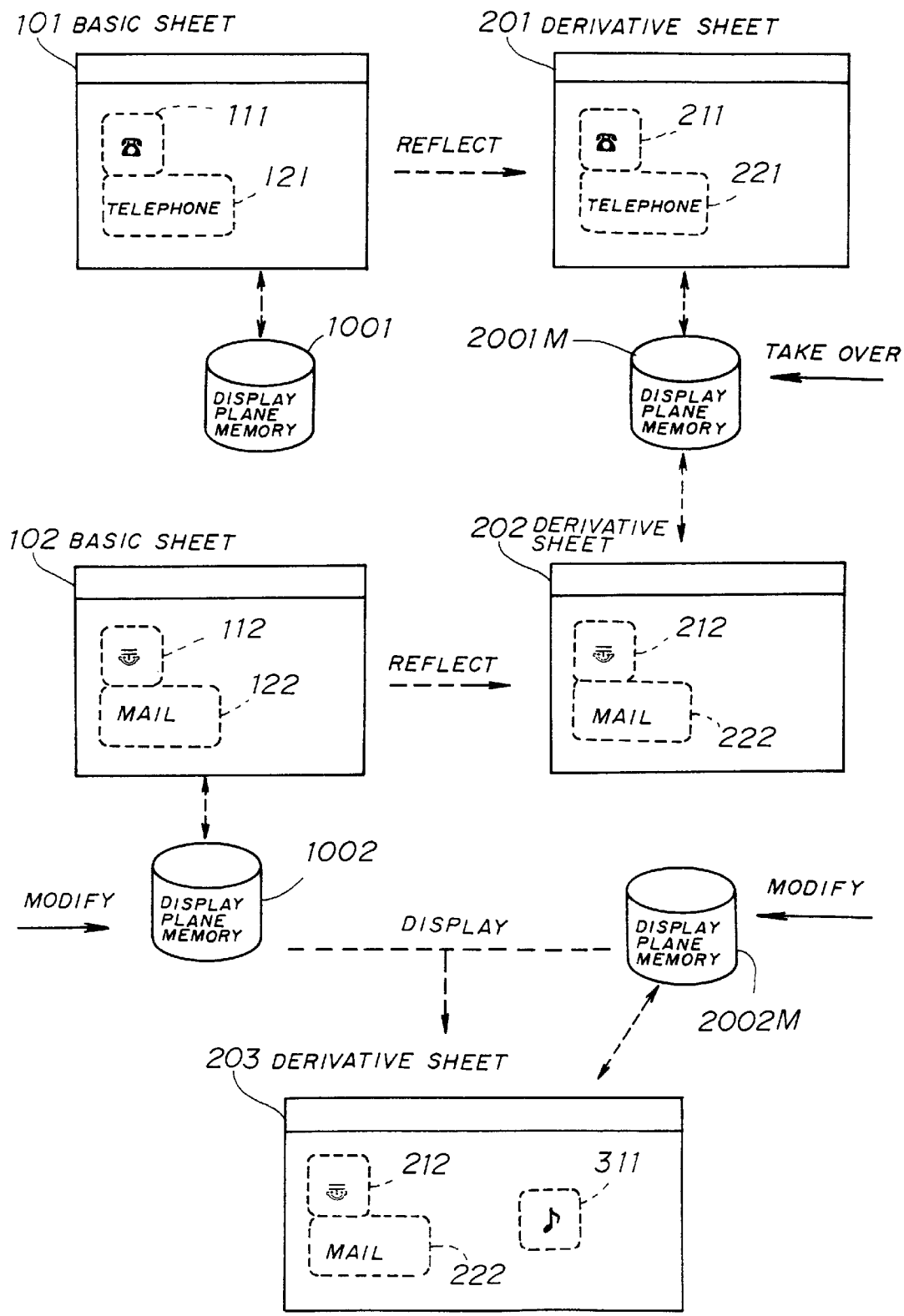
FIG. 7 is a diagram showing an editing work and displayed states according to the embodiment of the present invention.
Figure 8:
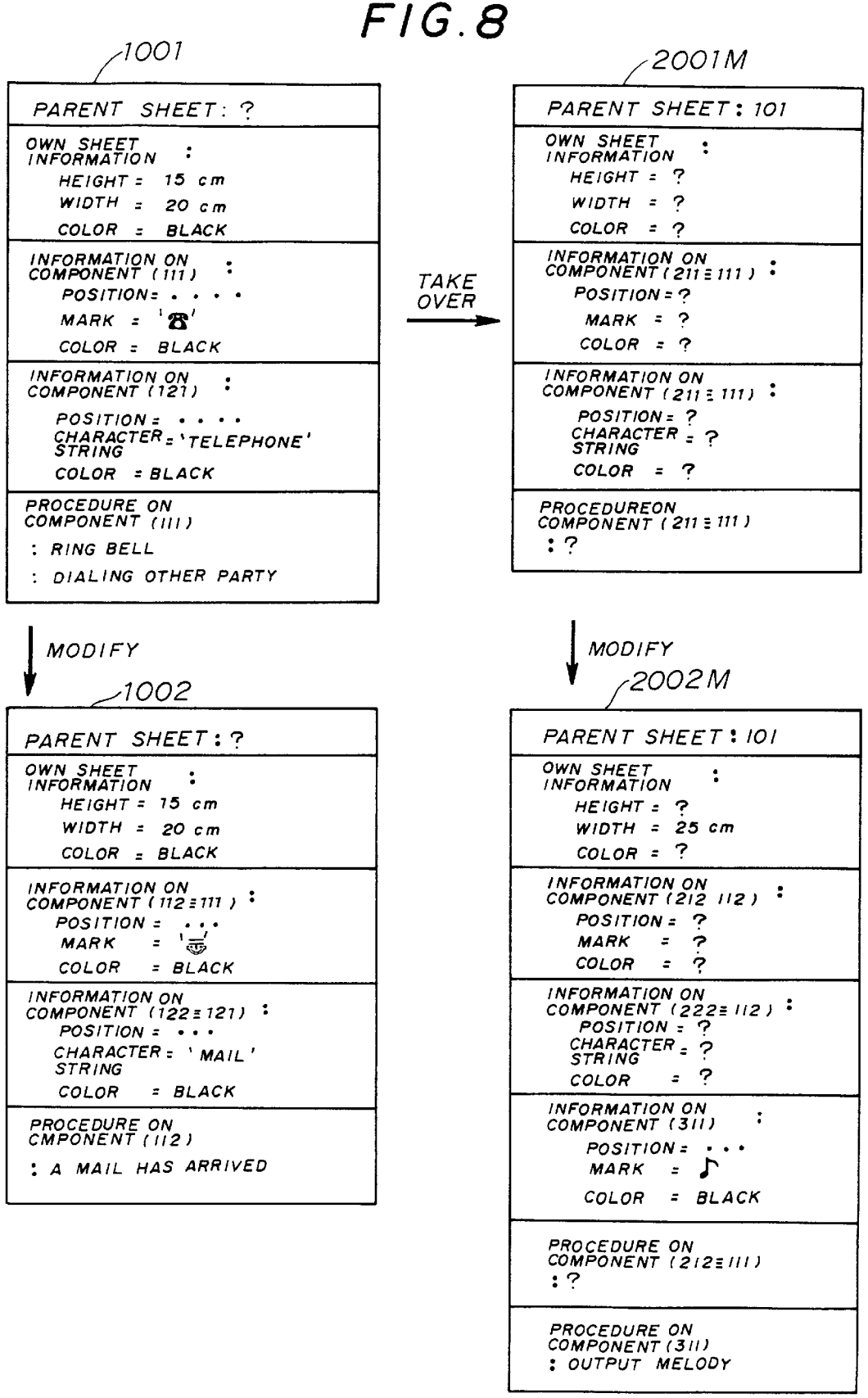
FIG. 8 is a diagram showing transition states of display plane memories.

A description will be given of a sheet editing work and operation in the structure shown in FIG. 5 by referring to FIGS. 7 and 8, wherein FIG. 7 shows the editing work and associated displays, and FIG. 8 shows state transitions of the related display plane memories.

First of all, the editing mode is specified by the mode setting part 24. The basic sheet 101 shown in the upper left portion of FIG. 7 is the parent sheet which the take-over source. In the basic sheet 101, two components consisting of the telephone mark 111 and the character train "telephone" 121 are arranged. The telephone mark 111 is assigned a procedure for ringing a bell or dialing.

FIG. 8 shows state transitions of the display plane memories corresponding to individual sheets in the memory 41 (FIG. 5). As shown, the state of the display plane memory 1001 forming the basic sheet 101 is described as follows:

A) No parent sheet is present because the sheet is the take-over source;

B) The sheet has a size "15 cm, 20 cm" and the display color thereof is "black";

C) The position of the component 111 is ". . . ", the mark thereof is "telephone mark", and the display color thereof is "black";

D) The position of the component 121 is ". . . ", the character string thereof is "telephone", and the display color is "black"; and E) The component 111 has a procedure for ringing a bell or dialing.

[Take-Over]

The first work is a take-over work. If the basic sheet 101 shown in FIG. 8 is not displayed on the display part 60, a predetermined operation is carried out in order to display the basic sheet 101 on the display part 60.

The take-over instruction part 10B outputs a take-over instruction signal by operating the editing menu that is not shown. Subsequently, the basic sheet 101 displayed on the display part 60 is specified as the take-over source by the position specifying part 10C (for example, clicking the button of the mouse). Further, the derivative sheet 201 newly created is specified by operating the menu. The two signals generated by the above sheet specifying operations are analyzed by the derivative sheet generating part 31, which the accesses the memory 41 through the read/write control part 14. As shown by an arrow which a term "TAKE OVER" is assigned in FIG. 8, a display plane memory 2001M is generated by using sheet forming data which is taken over from the display plane memory 1001 except for the attribute information. An identification code of the take-over-source basic sheet 101, such as "101" is written into the parent sheet column of the display plane memory 2001M.

The taken-over state is shown in the display plane memory 2001M located in the upper right portion of FIG. 8.

That is, the identification code "101" is stored in the parent sheet column of the display plane memory 2001M, and the attribute information concerning the own sheet is blank (however, for the sake of convenience, "?" is used in FIG. 8). The attribute information concerning the two components (211, 221) is given "?".

In the state in which the take-over work is completed, the sheet information read management part 32 reads the sheet forming data from the display plane memory 2001M. Thus, the attribute information concerning the components is read from the sheet forming data of the parent basic sheet 101 which is stored in the memory 1001 and is specified in the parent sheet column of the memory 2001M (derivative sheet 201 shown in the upper right portion of FIG. 7).

[Modification of Parent Sheet]

It will now be assumed that the two components of the basic sheet 101 are modified. More particularly, the telephone mark 111 is changed to the mail mark 112 and the procedure is changed to "voice". Further, the character train "telephone" 121 is changed to the character train "mail" 122.

If the basic sheet 101 is not displayed on the display part 60, the signal specifying the basic sheet 101 is generated by the position specifying part 10C shown in FIG. 5, and is input to the sheet generation executing part 13. Then, the sheet generation executing part 13 accesses the memory 41 through the read/write control part 14, and reads the display plane memory 1001 (shown in the upper left portion of FIG. 8). The sheet forming data read from the memory 41 is simultaneously input to the sheet information read management part 32, and is displayed on the display part 60 through the sheet drawing execution part 50. The upper sheet is not specified in the display plane memory 1001, and thus the sheet (basic sheet 101 shown in FIG. 7) can completely be displayed by only the information stored in the memory 1001.

When the basic sheet 101 is displayed on the display part 60, the position specifying part 10C (mouse cursor) is manipulated so that an instruction is input in the position of the component to be modified (for example, by clicking the mouse button). The instruction is analyzed by the sheet generation executing part 13, and an indication in which the present component is allowed to be modified is shown through the sheet drawing execution part 50. Thus, the data input part 10A (for example, keyboard) is operated so that modification data for changing the mark of the component 111 is changed from "telephone mark" to "mail mark" is input. The sheet generation executing part 13 changes the mark of the component 111 in the display plane memory 1001 from "telephone mark" to "mail mark" 112, and further changes the procedure of the component 112 so as to utter a voice message "mail has arrived" by operating the data input part 10A.

By a similar operation, the character train "telephone" is changed to character train "mail". The state of the display plane memory 1002 obtained when the above modifying work is completed is as shown in the lower left portion of FIG. 8, and the display state is as shown in the lower left portion of FIG. 7.

When the sheet forming data of the parent sheet is modified, all the modified state of the parent sheet is automatically reflected on the derivative sheet 202 (FIG. 4).

[Modification of Derivative Sheet]

It will now be assumed that the derivative sheet 201 is modified so that the sheet size is changed and a part 311 (FIG. 7, note mark) is added.

The position specifying part 10C is operated so as to drag the right end of the derivative sheet 202 so that the width of the derivative sheet 202 can be changed. The changed size is stored in a display plane memory 2002M obtained by modifying the display plane memory 2001M so that "width=?" in the own sheet is changed to "width=25 cm". As shown in FIG. 7, the derivative sheet 203 derived from the derivative sheet 202 is displayed on the display part 60 through the sheet information read management part 32 and the sheet drawing execution part 50.

The addition of the component 311 is carried out as follows. A component creation menu which is not shown, such as a tool bar, is selected in accordance with a given procedure. Then, the position specifying part 10C, such as the cursor, is moved to the position in the derivative sheet 202 (the center right portion of FIG. 7) in which the new component 311 should be placed, and the mouse button is clicked here. The indication signal generated by clicking is analyzed by the sheet generation executing part 13, which accesses the memory 41 (FIG. 5) through the read/write control part 14. Hence, the display plane memory 2001M shown in FIG. 8 is read. The items of the position information concerning the components in the display plane memory 2001M are assigned "?". Hence, the positions of the components are searched for by tracing the connection to the parent sheet. Hence, it is confirmed that there is no registered component in the specified position. Hence, a component registration column for the component 311 is newly provided in the display plane memory 2001M, so that the display plane memory 2002M is obtained.

Then, based on the predetermined procedure, the position information, the mark "note" and the display color "black" are input by the data input part 10A, and the "procedure" to be set to the present component 311 is registered. The state of the display plane memory 2002M obtained when the above modifying work is shown in the lower right portion of FIG. 8. The modifying work for the basic sheet 101 which is the parent sheet is reflected on the derivative sheet 202 shown in FIG. 7.

When the modifying work for the parent sheet and the modifying work for the derivative sheet are completed, the respectively display plane memories (1002, 2002M) are as shown in the lower portions of FIG. 8. Under the control of the sheet information read management part 32, the sheet forming data is read from the display plane memories (2002M, 1002), and the derivative sheet 203 shown in the lower portion of FIG. 7 is drawn.

[Case Where a Derivative Sheet is Created so as to Extend Over Two or More Layers]

Figure 1:
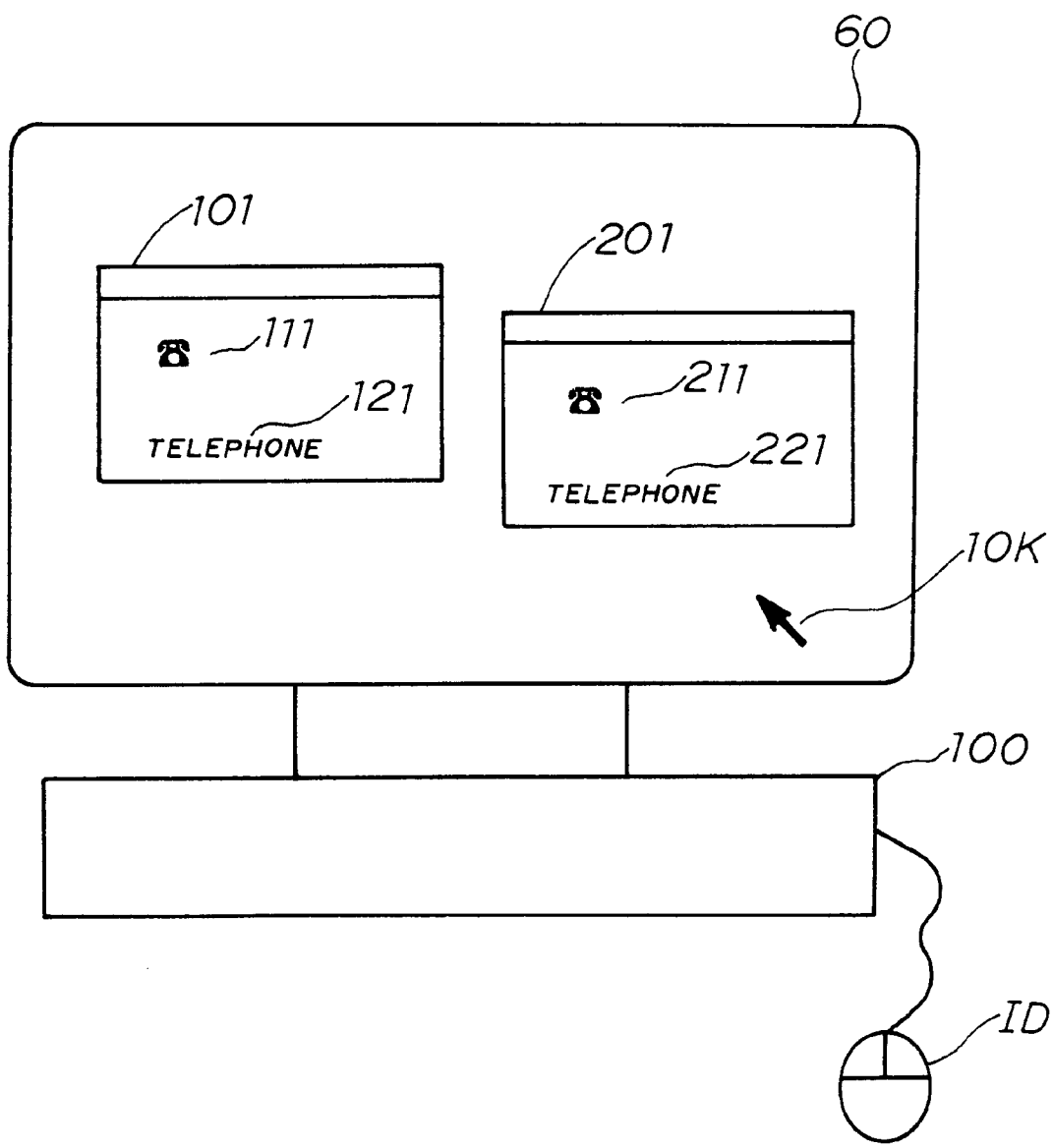
FIG. 1 is a diagram showing prior art.
Figure 2:
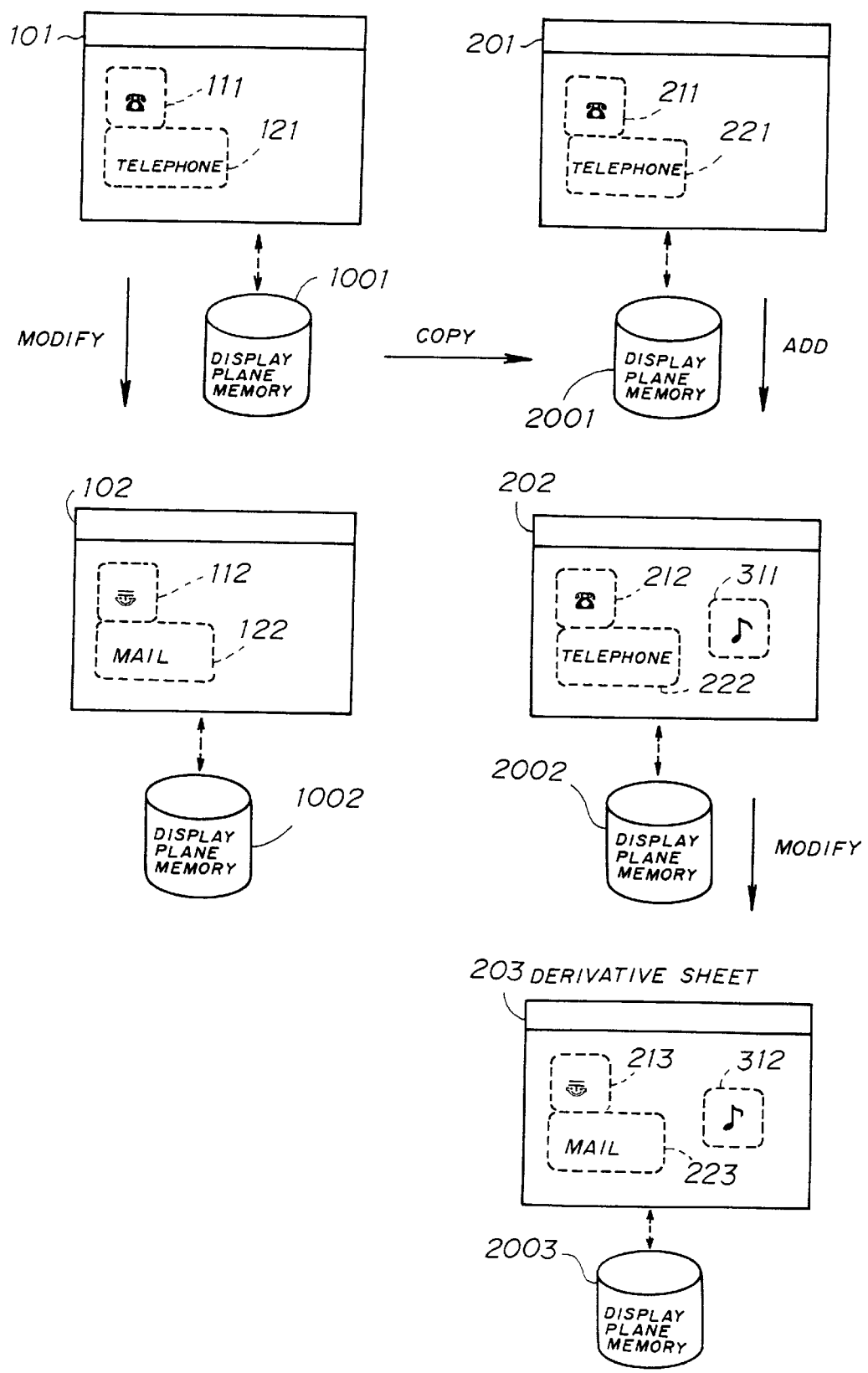
FIG. 2 is a diagram showing a conventional display plane work and displayed states.
Figure 3:
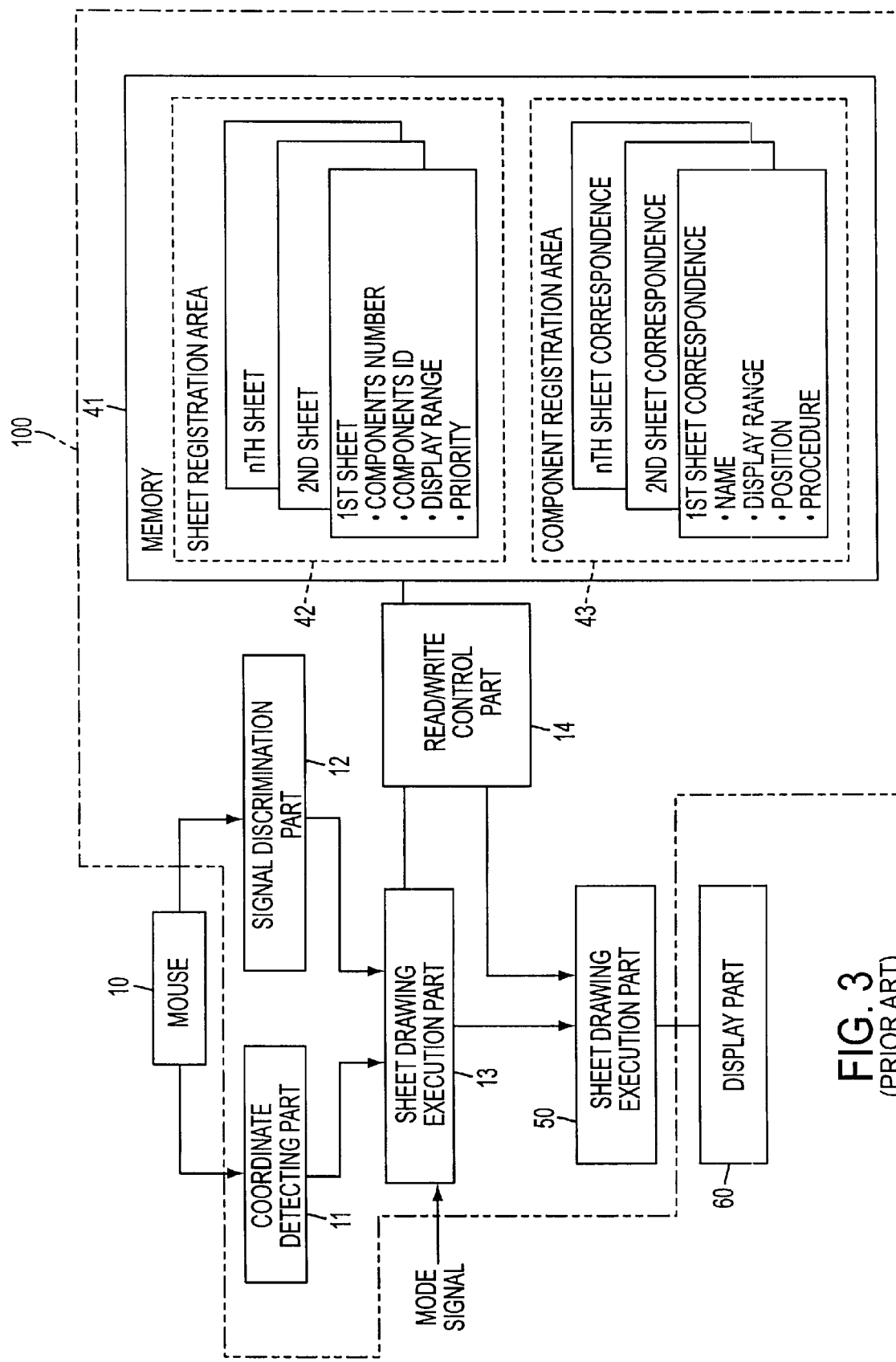
FIG. 3 is a diagram showing a structure of a conventional sheet processing means.

The display plane memories are provided for the respective sheets. Hence, if the first derivative sheet 201 is generated from the basic sheet 101 by the take-over process and the second derivative sheet 301 (not shown) is generated from the derivative sheet 201, the display plane memories (1001, 2001M, 3001M (not shown)) are provided. As shown in FIG. 3, the three display plane memories are chained by the upper sheet identification column 421.

The derivative sheet generating part 31 shown in FIG. 5 prepares an area (FIG. 6) for the display plane memory of the derivative sheet which is the first take-over destination.

The sheet identification information concerning the take-over source is stored in the upper sheet identification column 421. Then, the own sheet information column 422 except for the attribute information, the component information column 431 and the procedure information column 432 except for the procedure main body are taken over to the display plane memory of the derivative sheet from the display plane memory 1001 of the take-over source. However, it is not necessarily required to provide an area for the same display plane information as that of the upper sheet.

Regarding the components, the attribute information on which is assigned "?", the sheet information read management part 32 traces the chain information in the upper sheet identification column 421, and obtains the attribute information concerning the components in the take-over source. When the take-over extends over three layers such as a parent, a child and a grandchild, the attribute information concerning the components are obtained in the child sheet by searching the display plane memory of the parent sheet. In the grandchild sheet, the display plane memory of the child sheet is searched first. If there is the attribute information concerning the components, it is obtained. If "?" is present, the display plane memory of the parent sheet is traced and searched.

If the components are deleted at the time of modifying the take-over source sheet, the components are not found even by tracing the hierarchical structure up to the take-over source sheet at the time of displaying the take-over destination sheet. In such a case, the sheet information read management part 32 outputs an alarm or the like.

Since the components are commonly used between the sheets, a known technique can be used to chain the sheets using sheet identifiers. For example, segmented numbers and mnemonic codes can be used for management.

A take-over chain giving high priority to sheets comparatively close to each other is employed so that the upper sheets can be accessed by the minimum tracing route.

[Execution Mode]

The position specifying part 10C is operated so that the cursor 10K is positioned to the note mark 311 of the derivative sheet 203, and the button of the mouse 10 is clicked. The sheet generating execution part 13 supplied with the position signal generated by the click operation and a click type signal accesses the memory 41 through the read/write control part 14.

Then, the sheet generating execution part 13 searches the sheet registration area 42 and the component registration area 43, and compares the specified component (note mark 311) with the registered components.

More specifically, the display plane memory 2002M shown in FIG. 8 is searched and the coordinates of the position of the component 311 are compared with the registered information. If the coordinates of the position of the component 311 are found, it is determined whether there is a procedure which is assigned to the component. If a procedure for outputting a melody is defined, the procedure is executed so that the melody is output.

If the click position of the cursor 10K 23 corresponds to the mail mark 212 of the derivative sheet 203, the sheet generating execution part 13 instructs the sheet information read management part 32 to execute the procedure of the mail mark 212. In response to the above instruction, the sheet information read management part 32 refers to the component (212) of the display plane memory 2002M, and recognizes that the present component is taken over to the parent sheet (basic sheet 102), and a procedure is defined for the component.

Thus, the display plane memory 1002 is retrieved by referring to "101" in the parent sheet take-over column. Then, the sheet drawing execution part 50 executes the procedure for the component (111), that is, the component (112). Hence, a voice message "mail has arrived" is output.

A description will be given of a computer system which implements the above information display device.

Figure 9:
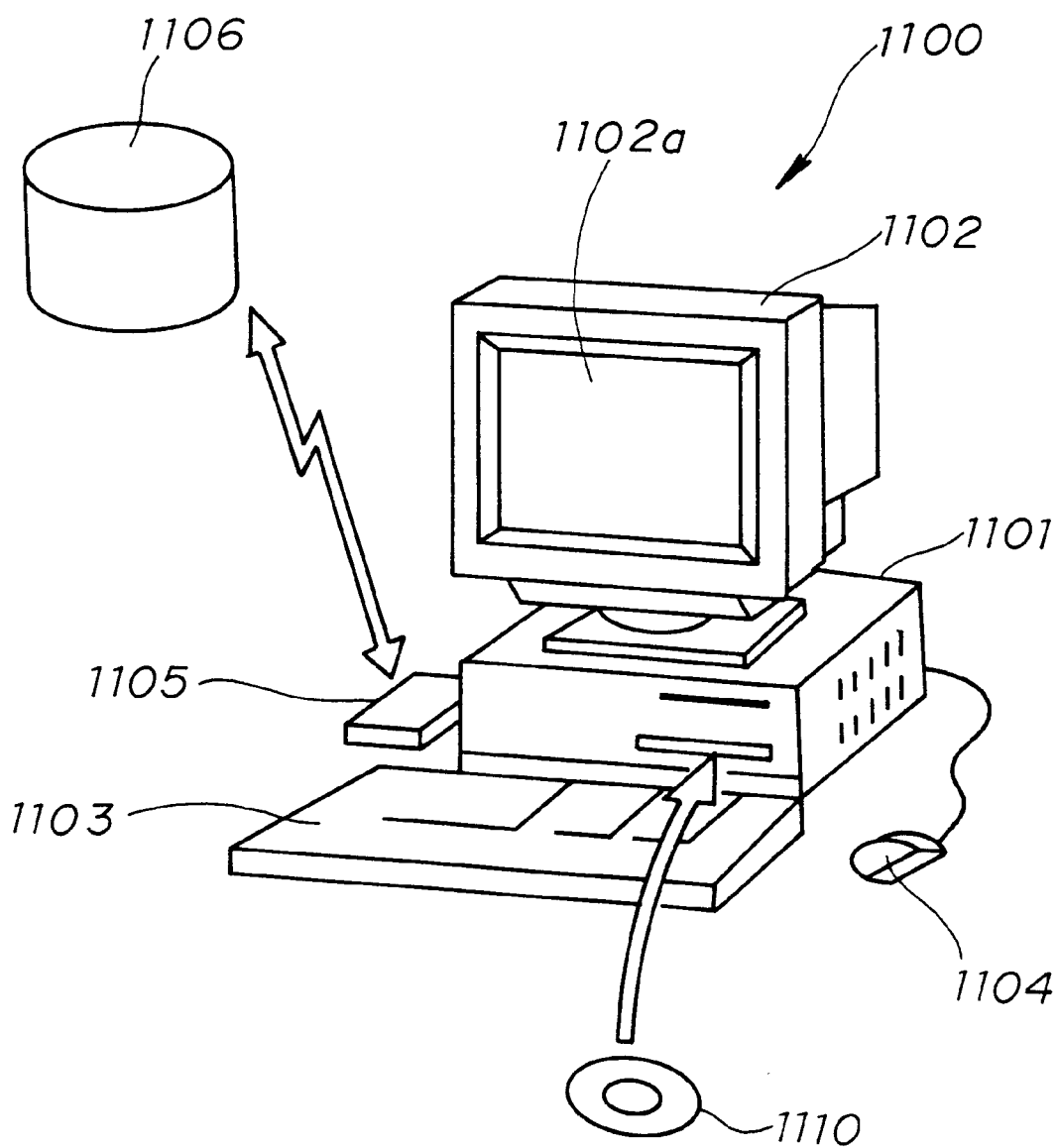
FIG. 9 is a diagram showing a computer system which implements the information display device of the present invention.

The computer system shown in FIG. 9 includes a main frame 1101 having a CPU, a memory, a speech codec, a speaker and a disk drive, a display 1102 displaying an image on a screen 1102a in accordance with instructions from the main frame, a keyboard 1103 for inputting a variety of information to the computer system 1100, a mouse 1104 specifying an arbitrary position on the screen 1102a, and a modem 1105 used to access an external database 1106. A display plane program is stored in a portable recording medium such as the disk 1110 or is down loaded from the external database 1106 using the modem 1105. Then the downloaded program is input to the computer system 1100 and is executed.

The display plane program stored in the disk 1110 or the like includes the display plane generating means 2, the derivative display plane generating means 3A, the logical display plane displaying means 7, and a part which controls access to the memory means 4. In other words, a computer readable recording medium storing a computer program comprises: a memory function part for causing a computer to store, in a memory, items of display plane forming information respectively corresponding to a plurality of logical display planes; a display plane generating function part for causing the computer to register, in the memory, display plane forming information concerning a new display plane and modify the display plane forming information concerning the existing logical display plane; a derivative display plane generating function part for causing the computer to set a take-over relationship between the items of the display plane forming information concerning the logical display planes stored in the memory; and a logical display plane displaying function part for causing the computer to display the logical display plane to be displayed on the basis of the display plane forming information concerning the logical display plane to be displayed and the display plane forming information of the logical display plane which is a take-over source with respect to the logical display plane to be displayed.

As described above, it is possible to commonly own and use the display plane forming information and the event procedures among the initial display plane and the derivative planes when the event outputting and operation are carried out through the screen and the procedure of the information processing proceeds with transitions. Hence, when the derivative display planes which take over in the hierarchical structure are created, it is possible to reduce the work of modifying the derivative display planes that are the take-over destinations and to automatically reflect the results of the modifying work for the display plane of the take-over source on the derivative display planes of the take-over destinations without any particular work and affecting the proceeding of the procedures.

What is claimed is:

1. An information display device capable of displaying logical display planes having a hierarchical relationship, the device comprising:

first means for storing items of display plane forming information respectively defined for the logical display planes; and second means for displaying the stored logical display planes on a screen part in accordance with the items of the display plane forming information;

the items of the display plane forming information of logical display planes that have a hierarchical relationship include information describing the hierarchical relationship;

the items of display plane forming information having a hierarchical relationship share and respond to appearance information concerning a component commonly used in the logical display planes, wherein when appearance information for a selected display plane is modified, the items of display planes having a hierarchical relationship with the selected display plane will automatically reflect the modified appearance information while values of displayed items in the display planes having the hierarchical relationship with the selected display plane remain unchanged.

2. The information display device as claimed in claim 1, wherein, when the second means displays a first logical display plane, the second means refers to the display plane forming information concerning the first logical display plane, and the display plane forming information concerning a second logical display plane which is located in a hierarchical level higher than that in which the first logical display plane is located.

3. The information display device as claimed in claim 1 further comprising third means for, when it is instructed to create a second logical display plane from a first logical display plane, creating the display plane forming information concerning the second logical display plane including information indicating the first logical display plane and for storing the created display plane forming information in the first means.

4. The information display device as claimed in claim 1, wherein:

the display plane forming information of the logical display plane located in an upper layer of the hierarchical relationship includes the appearance information concerning the components which are common to the logical display plane located at a lower layer; and the display plane forming information concerning the display plane located at the lower layer includes the appearance information inherent in the logical display plane located at the lower layer.

5. The information display device as claimed in claim 1, wherein the appearance information includes at least one of information concerning a display of the components and the appearance information concerning procedures which should be carried out with regard to the components.

6. An information display device comprising:

a memory storing display plane forming information items forming information respectively corresponding to a plurality of logical display planes;

a display plane generator registering display plane forming information concerning a new display plane and modifying the display plane forming information concerning an existing logical display plane;

a derivative display plane generator setting a take-over relationship between items of the display plane forming information concerning the logical display planes stored in the memory;

a logical display plane display displaying the logical display plane to be displayed on the basis of the display plane forming information concerning the logical display plane to be displayed and the display plane forming information of the logical display plane which is a take-over source with respect to the logical display plane to be displayed, wherein when appearance information of items of a selected display plane are modified, display planes having the take-over relationship with the selected display plane will automatically reflect the modified appearance information while values of displayed items in the display planes having the take-over relationship with the selected display plane remain unchanged.

7. The information display device as claimed in claim 6, further comprising an input device inputting necessary instructions to the display plane generator and the derivative display plane generator, and the logical display plane display.

8. A computer readable recording medium storing a computer program comprising:

a memory function part for causing a computer to store, in a memory, items of display plane forming information respectively corresponding to a plurality of logical display planes;

a display plane generating function part for causing the computer to register, in the memory, display plane forming information concerning a new display plane and modify the display plane forming information concerning the existing logical display plane;

a derivative display plane generating function part for causing the computer to set a takeover relationship between the items of the display plane forming information concerning the logical display planes stored in the memory;

a logical display plane displaying function part for causing the computer to display the logical display plane to be displayed on the basis of the display plane forming information concerning the logical display plane to be displayed and the display plane forming information of the logical display plane which is a take-over source with respect to the logical display plane to be displayed, wherein when appearance information of items of a selected display plane are modified, display planes having the take-over relationship with the selected display plane will automatically reflect the modified appearance information while values of displayed items in the display planes having the take-over relationship with the selected display plane remain unchanged.

9. A method, comprising:

creating windows having hierarchical relationships and appearance information for each window, each window displaying data formatted with each window's respective appearance information;

modifying appearance information of a selected window; and changing appearance information of windows having a hierarchical relationship with the selected window to match the modified attributes of the selected window, so that the displayed data in the windows having a hierarchical relationship with the selected window is formatted using the changed appearance information while the data itself remains unchanged.

10. The method recited in claim 9, further comprising defining which particular windows have hierarchical relationships with other windows.

11. A computer readable storage medium, storing a computer program instructing a computer to perform:

allowing a user to create windows having hierarchical relationships and appearance information for each respective window, each window displaying data formatted with each window's respective appearance information;

allowing a user to modify appearance information of a selected window; and automatically changing the appearance information of windows having a hierarchical relationship with the selected window to match the modified appearance information of the selected window, so that the displayed data in the windows having a hierarchical relationship with the selected window is formatted using the changed appearance information while the data itself remains unchanged.

12. The computer readable storage medium recited in claim 11, further comprising allowing a user to define which particular windows have hierarchical relationships with other windows.

13. An apparatus, comprising:

a memory device storing a plurality of windows having hierarchical relationships and appearance information, each window displaying data formatted with the window's respective appearance information;

an input device inputting a selected window of the plurality of windows stored in the memory device and new appearance information for the selected window; and a processing device changing stored appearance information of windows having a hierarchical relationship with the selected window to match the inputted new appearance information for the selected window, so that the displayed data in the windows having a hierarchical relationship with the selected window is formatted using the changed appearance information while the data itself remains unchanged.

14. The apparatus recited in claim 13, wherein the input device inputs which windows have hierarchical relationships with other windows.

15. A method comprising:

creating windows having hierarchical relationships with other windows, each window displaying data values which are formatted based on appearance information attributes associated with each respective window;

receiving a modification of appearance information attributes with respect to a selected window of the created windows; and automatically copying the modified appearance information attributes to appearance information attributes associated with windows having a hierarchical relationship with the selected window, so that data values displayed in the windows having a hierarchical relationship with the selected window are formatted using the modified appearance information attributes while the actual data values remain the same.

16. The method recited in claim 15, further comprising defining which particular windows have hierarchical relationships with other windows.

17. A computer readable storage medium storing a program instructing a computer to perform:

creating windows having hierarchical relationships with other windows, each window displaying data values which are formatted based on appearance information attributes associated with each respective window;

receiving a modification of appearance information attributes with respect to a selected window of the created windows; and automatically copying the modified appearance information attributes to appearance information attributes associated with windows having a hierarchical relationship with the selected window, so that data values displayed in the windows having a hierarchical relationship with the selected window are formatted using the modified appearance information attributes while the actual data values remain the same.

18. The computer readable storage medium as recited in claim 17, further performing defining which particular windows have hierarchical relationships with other windows.

19. An apparatus comprising:

a window creating unit creating windows having hierarchical relationships with other windows, each window displaying data values which are formatted based on appearance information attributes associated with each respective window;

an inputting unit inputting a modification of appearance information attributes with respect to a selected window of the created windows; and a copying unit automatically copying the modified appearance information attributes to appearance information attributes associated with windows having a hierarchical relationship with the selected window, so that data values displayed in the windows having a hierarchical relationship with the selected window are formatted using the modified appearance information attributes while the actual data values remain the same.

20. An apparatus as recited in claim 19, further comprising a defining unit defining which particular windows have hierarchical relationships with other windows.

* * * * *

UNITED STATES PATENT AND TRADEMARK OFFICE
CERTIFICATE OF CORRECTION

PATENT NO.    : 6,339,439  
DATED         : January 15, 2002  
INVENTOR(S)   : Yoshio Takahashi et al.

Page 1 of 1

It is certified that error appears in the above-identified patent and that said Letters Patent is hereby corrected as shown below:

<u>Column 16,</u>
Line 15, begin a new paragraph with "automatically".

Signed and Sealed this

Seventh Day of May 2002

*Attest:*

*Attesting Officer*

JAMES E. ROGAN  
*Director of the United States Patent and Trademark Office*